US012239867B2

(12) United States Patent
Chiba et al.

(10) Patent No.: US 12,239,867 B2
(45) Date of Patent: Mar. 4, 2025

(54) SPRINKLER HEAD

(71) Applicant: SENJU SPRINKLER CO., LTD., Tokyo (JP)

(72) Inventors: Masaharu Chiba, Tokyo (JP); Yutaka Tateishi, Tokyo (JP); Kazuma Ito, Tokyo (JP)

(73) Assignee: SENJU SPRINKLER CO., LTD., Tokyo (JP)

( * ) Notice: Subject to any disclaimer, the term of this patent is extended or adjusted under 35 U.S.C. 154(b) by 395 days.

(21) Appl. No.: 17/781,626

(22) PCT Filed: Dec. 23, 2020

(86) PCT No.: PCT/JP2020/048259
§ 371 (c)(1),
(2) Date: Jun. 1, 2022

(87) PCT Pub. No.: WO2021/132382
PCT Pub. Date: Jul. 1, 2021

(65) Prior Publication Data
US 2023/0038975 A1 Feb. 9, 2023

(30) Foreign Application Priority Data
Dec. 24, 2019 (JP) ................................ 2019-232182

(51) Int. Cl.
*A62C 37/09* (2006.01)
*A62C 37/12* (2006.01)

(52) U.S. Cl.
CPC .............. *A62C 37/09* (2013.01); *A62C 37/12* (2013.01)

(58) Field of Classification Search
CPC ................................ A62C 37/09; A62C 37/12
See application file for complete search history.

(56) References Cited

U.S. PATENT DOCUMENTS 930,845 A 8/1909 Dawes
4,066,129 A * 1/1978 Anderson .............. A62C 37/10 285/46

(Continued)

FOREIGN PATENT DOCUMENTS

CN 1496745 A 5/2004
CN 102170941 A 8/2011

(Continued)

OTHER PUBLICATIONS

Chinese Office Action for Application No. 2020800715934 (Jan. 19, 2023).

(Continued)

*Primary Examiner* — Joseph A Greenlund
(74) *Attorney, Agent, or Firm* — Future IP LLC; Tomoko Nakajima

(57) ABSTRACT

A cylindrical portion forms, at a first holding position, a first airflow path in which a communication portion open to a lower end of the body serves as a first introduction port for the outside air and in which a missing portion lacking a portion of a surrounding wall of the cylindrical portion serves as, by overlapping a slit open to an outer peripheral surface of the body, a first exit through which the outside air flowed in the body is discharged to above the ceiling, and forms, at a second holding position, a second airflow path in which a gap formed between an escutcheon and a heat collector projecting from the lower end of the body serves as a second introduction port for the outside air and in which the missing portion serves as a second exit through which the outside air is discharged to above the ceiling.

14 Claims, 5 Drawing Sheets

(56) References Cited

U.S. PATENT DOCUMENTS

| | | | | |
|---|---|---|---|---|
| 4,651,832 | A * | 3/1987 | Kubo | A62C 37/10 169/42 |
| 4,660,648 | A * | 4/1987 | Zen | A62C 37/09 169/41 |
| 5,447,338 | A | 9/1995 | Kikuchi | |
| 5,497,834 | A | 3/1996 | Onuki | |
| 6,044,912 | A * | 4/2000 | Tsuji | A62C 37/12 169/42 |
| 6,439,315 | B2 * | 8/2002 | Onuki | A62C 37/12 169/59 |
| 7,055,614 | B1 | 6/2006 | Ide | |
| 7,104,335 | B2 * | 9/2006 | Shim | A62C 37/08 169/42 |
| 7,543,654 | B2 * | 6/2009 | Koiwa | A62C 37/09 169/41 |
| 8,381,825 | B1 | 2/2013 | Golinveaux et al. | |
| 9,114,267 | B2 * | 8/2015 | VanEerden | A62C 37/12 |
| 9,320,929 | B2 * | 4/2016 | Koiwa | A62C 35/68 |
| 9,320,930 | B2 * | 4/2016 | Abels | A62C 37/08 |
| 9,339,675 | B2 * | 5/2016 | Koiwa | A62C 37/08 |
| 9,463,343 | B2 * | 10/2016 | Koiwa | A62C 37/12 |
| 9,630,039 | B2 * | 4/2017 | Koiwa | B25B 13/02 |
| 9,643,038 | B1 | 5/2017 | Chen | |
| 10,905,909 | B2 * | 2/2021 | Ringer | A62C 37/09 |
| 11,413,485 | B2 * | 8/2022 | Kikuchi | A62C 37/12 |
| D972,079 | S * | 12/2022 | Chiba | D23/214 |
| 11,938,359 | B2 * | 3/2024 | Meyer | B05B 1/267 |
| 2006/0037761 | A1 * | 2/2006 | Shim | A62C 37/09 169/37 |
| 2007/0215720 | A1 * | 9/2007 | Koiwa | A62C 37/09 239/201 |
| 2008/0115948 | A1 | 5/2008 | Koiwa | |
| 2009/0114404 | A1 | 5/2009 | Kikuchi et al. | |
| 2010/0243282 | A1 * | 9/2010 | Rekeny | A62C 37/12 169/51 |
| 2011/0247836 | A1 | 10/2011 | Takeuchi | |
| 2012/0267125 | A1 * | 10/2012 | Abels | A62C 37/08 169/41 |
| 2012/0285707 | A1 * | 11/2012 | Kameishi | A62C 37/12 169/39 |
| 2013/0020406 | A1 * | 1/2013 | Koiwa | B25B 13/02 81/52 |
| 2013/0284463 | A1 | 10/2013 | Multer et al. | |
| 2016/0121363 | A1 | 5/2016 | Connery et al. | |
| 2017/0007869 | A1 * | 1/2017 | Ohkoshi | A62C 31/02 |
| 2017/0319884 | A1 * | 11/2017 | Oldham | A62C 37/12 |
| 2018/0304111 | A1 * | 10/2018 | Karihara | B05B 1/267 |
| 2019/0099983 | A1 * | 4/2019 | Tow | A62C 37/09 |
| 2019/0374802 | A1 | 12/2019 | Coletta et al. | |
| 2021/0016120 | A1 * | 1/2021 | Kikuchi | A62C 31/02 |
| 2021/0094051 | A1 | 4/2021 | Koiwa | |
| 2021/0162249 | A1 * | 6/2021 | Oldham | B05B 1/267 |
| 2023/0038975 | A1 * | 2/2023 | Chiba | A62C 37/09 |
| 2023/0050624 | A1 * | 2/2023 | Pipe | A62C 37/11 |
| 2024/0198154 | A1 * | 6/2024 | Chiba | A62C 37/12 |

FOREIGN PATENT DOCUMENTS

| | | | |
|---|---|---|---|
| CN | 108686326 | A | 10/2018 |
| CN | 111432894 | A | 7/2020 |
| JP | 2005-027929 | A | 2/2005 |
| JP | 2008-154938 | A | 7/2008 |
| JP | 2012-147821 | A | 8/2012 |
| JP | 2013-208146 | A | 10/2013 |
| JP | 2014-121357 | A | 7/2014 |
| TW | 200706208 | A | 2/2007 |
| WO | WO2006/120729 | A1 | 11/2006 |
| WO | WO2010038253 | A1 | 4/2010 |

OTHER PUBLICATIONS

Japanese Notice of Allowance for Application No. 2022-201425 (Aug. 22, 2023) with English language translation thereof.

European Search Report for Application No. EP20905861.9 (dated Nov. 8, 2023).

International Search Report for PCT Patent App. No. PCT/JP2020/048259 (Jan. 26, 2021).

Taiwanese Office Action for Application No. 109143219 (dated Feb. 23, 2024) with English language translation thereof.

* cited by examiner

SPRINKLER HEAD

This application is a national phase entry under 35 U.S.C. § 371 of PCT Patent Application No. PCT/JP2020/048259, filed on Dec. 23, 2020, which claims priority under 35 U.S.C. § 119 to Japanese Patent Application No. 2019-232182, filed Dec. 24, 2019, both of which are incorporated by reference.

TECHNICAL FIELD

The present invention relates to a sprinkler head for extinguishing a fire.

BACKGROUND ART

A sprinkler head automatically activates and releases water in the event of a fire. A nozzle is normally closed by a valve, and the valve is supported at a lower end of a main body by a heat-sensitive disassembling unit. A heat-sensitive element that is incorporated in the heat-sensitive disassembling unit is activated by the heat of a fire, so that the heat-sensitive disassembling unit operates in a disassembled manner. The valve that has been pressed against the nozzle by the heat-sensitive disassembling unit is separated from the nozzle, and the nozzle is opened. Water that is released from the nozzle strikes a plate-shaped deflector that is disposed in a direction in which the axis of the nozzle extends, and the water is sprayed in all directions so as to extinguish the fire.

An example of the above-mentioned sprinkler head is a flash-type sprinkler head. A flash-type sprinkler head is provided by embedding its main body that is connected to a water supply pipe into a ceiling such that only a lower portion of a heat-sensitive disassembling unit projects from the ceiling surface toward the inside of a room.

CITATION LIST

Patent Literature

PTL 1: Japanese Unexamined Patent Application Publication No. 2005-27929

SUMMARY OF INVENTION

Technical Problem

It is preferable in terms of design that a portion of a flash-type sprinkler head, the portion projecting from a ceiling surface toward the inside of a room, be small and inconspicuous. However, if a heat-sensitive disassembling unit is disposed inside a ceiling, the heat of a fire is less likely to be transferred to a heat-sensitive element, and there is a possibility that it will take time for the sprinkler head to operate.

There is a sprinkler head in which a component that covers a heat-sensitive element has a hole in order to facilitate transfer of heat to the heat-sensitive element (see, for example, PTL 1). However, some customers think that the hole formed in the component impairs the design of the sprinkler head. In addition, the interface strength between the heat-sensitive element and the component covering the heat-sensitive element decreases, so that there is a concern that the component may be damaged or may come off during transportation of the sprinkler head or at the time of construction.

Accordingly, it is an object of the present application to improve sensitivity performance of a sprinkler head without impairing the design of the sprinkler head.

Solution to Problem

In an aspect of the present application, a sprinkler head includes a body having a slit that is open to an outer peripheral surface of the body, a heat collector held by the body in such a manner as to project from a lower end of the body, and an escutcheon including a cylindrical portion that engages with the body and a plate portion that has an outer peripheral edge extending outward from a lower end of the cylindrical portion, the outer peripheral edge being capable of being brought into contact with a ceiling surface. The cylindrical portion has a missing portion that lacks a surrounding wall of the cylindrical portion. The cylindrical portion is capable of being held, with respect to the body, at a first holding position and at a second holding position in accordance with an insertion depth of the cylindrical portion with respect to the body. The sprinkler head forms, at the first holding position, a first airflow path in which a communication portion that is open to the lower end of the body serves as a first introduction port for outside air and in which the missing portion of the cylindrical portion serves as, by overlapping the slit of the body, a first exit through which the outside air that has flowed in the body is discharged to an area above a ceiling, and the sprinkler head forms, at the second holding position, a second airflow path in which a gap that is formed between the escutcheon and the heat collector serves as a second introduction port for the outside air and in which the missing portion of the cylindrical portion serves as a second exit through which the outside air is discharged to the area above the ceiling.

In the aspect of the present disclosure, the sprinkler head includes the escutcheon including the cylindrical portion that is capable of being held, with respect to the body, at the first holding position and at the second holding position in accordance with its insertion depth with respect to the body of the sprinkler head and the plate portion that has the outer peripheral edge extending outward from the lower end of the cylindrical portion, the outer peripheral edge being capable of being brought into contact with the ceiling surface. Consequently, according to the aspect of the present disclosure, the plate portion covers a hole formed between the ceiling and the sprinkler head, and the cylindrical portion can accommodate the heat collector therein. Thus, the sprinkler head is inconspicuous when viewed from the inside of a room, and the design of the sprinkler head can be improved.

In addition, in the aspect of the present disclosure, the sprinkler head includes the body having the slit that is open to an outer peripheral surface of the body, the heat collector projecting from the lower end of the body, and the escutcheon including the cylindrical portion that has the missing portion that lacks the surrounding wall of the cylindrical portion and that engages with the body. At the first holding position, the first airflow path in which the communication portion that is open to the lower end of the body serves as the first introduction port for the outside air and in which the missing portion of the cylindrical portion serves as, by overlapping the slit of the body, the first exit through which the outside air that has flowed in the body is discharged to the area above the ceiling is formed, and at the second holding position, the second airflow path in which the gap formed between the escutcheon and the heat collector serves as the second introduction port for the outside air and in which the missing portion of the cylindrical portion serves as the second exit through which the outside air is discharged to the area above the ceiling is formed.

Thus, according to the aspect of the present disclosure, the first airflow path is formed at the first holding position, and the second airflow path is formed at the second holding position, so that, at both the holding positions, a continuous airflow can be generated by facilitating discharging of the outside air to the area above the ceiling. Therefore, according to the aspect of the present disclosure, the heat of air that is generated in the room due to a fire can be efficiently transferred to the heat collector, and an early operation of the sprinkler head can be facilitated.

The sprinkler head according to the aspect of the present disclosure includes a heat-sensitive element and the heat collector that has a bowl-like shape and a plurality of openings formed in a side surface thereof, and the gap can be formed such that air can pass through the gap toward the openings.

According to the above configuration, since the heat collector has the plurality of openings that are formed in the side surface thereof and through which the air from the gap can pass, the air heated by the heat of a fire can easily flow into the heat collector through the openings. The air that has flowed in the heat collector enables the heat collector to absorb the heat also from the inside thereof. Accordingly, the heat-sensitive element absorbs the heat also from a surface of the heat-sensitive element in addition to the heat transferred thereto from the heat collector, and thus, the operation of the sprinkler head can be facilitated.

In addition to the above-described configuration, the sprinkler head may further include a heat-sensitive element that is accommodated in the heat collector. The heat-sensitive element may include a cylinder that has a cylindrical shape with a bottom and in which a fusible alloy is loaded. An external screw that projects from a bottom surface of the cylinder may be connected to a nut that is provided on the heat collector. In addition, the nut may have an end that is closer to the heat collector and that has a larger diameter and another end that is closer to the cylinder and that has a smaller diameter. According to the aspect of the present disclosure, since the heat-sensitive element can be accommodated in the heat collector, a configuration that does not impair the design of the sprinkler head can be employed. In addition, by connecting the heat collector and the cylinder via the nut, a stable interface strength can be obtained.

In addition, in the aspect of the present disclosure, an end surface of the nut on the cylinder side is in surface contact with the bottom surface of the cylinder, and it can be configured to minimize the loss of heat that is transferred from the nut to the fusible alloy via the bottom surface of the cylinder. More specifically, when the outer diameter of the nut on the cylinder side is set to be equal to or smaller than the diameter of the bottom surface of the cylinder, heat can be transferred from the end surface of the nut on the cylinder side to the bottom surface of the cylinder without loss. In addition, when the outer diameter of the nut on the cylinder side is set to be equal to or smaller than the inner diameter of a portion of the cylinder that loads the fusible alloy, the heat can be more efficiently transferred to the fusible alloy by suppressing the heat from being transferred to the side surface of the cylinder.

In the aspect of the present disclosure, the nut can have a step formed between an end of the nut on the heat collector side and an end of the nut on the cylinder side. According to the aspect of the present disclosure, the surface area is increased by the step compared with the case where the nut has a cylindrical shape, and thus, more heat can be absorbed.

Advantageous Effects of Invention

As described above, according to an aspect of the present disclosure, sensitivity performance of a sprinkler head can be improved without impairing the design of the sprinkler head.

BRIEF DESCRIPTION OF DRAWINGS

FIG. 7(*a*) is a partial sectional view illustrating the case where the amount of projection of the sprinkler head toward the inside of a room with respect to the escutcheon is minimum. FIG. 7(*b*) is a partial sectional view illustrating the case where the amount of projection of the sprinkler head toward the inside of a room with respect to the escutcheon is maximum.

DESCRIPTION OF EMBODIMENTS

Figure 1:
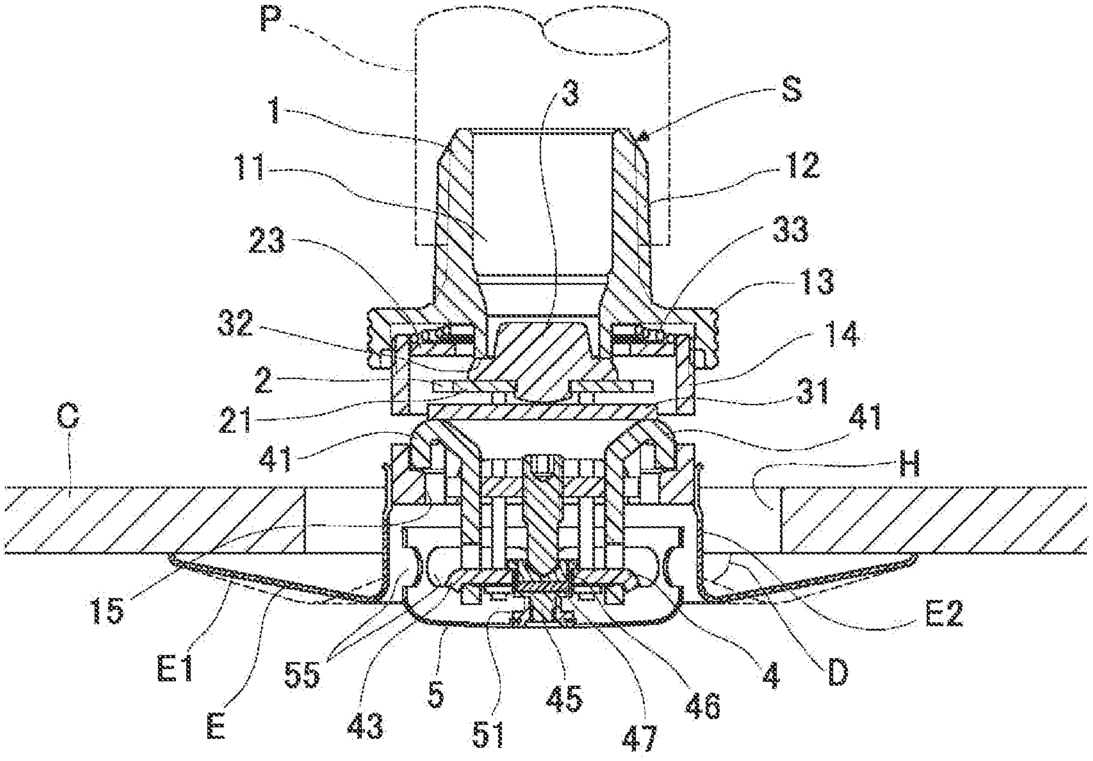
FIG. 1 is a sectional view of a sprinkler head according to an embodiment of the present invention.

An embodiment of a "sprinkler head" of the present invention will be described with reference to FIG. 1 to FIG. 5. A sprinkler head S includes a body 1, a deflector unit 2, a closing member 3, a heat-sensitive disassembling unit 4, and a heat collector 5.

The body 1 has a hollow cylindrical shape, and the interior of the body 1 serves as a nozzle 11. The nozzle 11 extends in a cylindrical axis direction (a height direction, the vertical direction) between a first end and a second end of the body 1. An external thread 12 that is connected to a water supply pipe P is provided on the first end portion of the body 1. The body includes a flange portion 13 that is provided on the second end portion of the body 1 and that is extended outward, and a cylindrical frame 14 is connected to the flange portion 13 by screw connection. A step 15 that extends toward the inner periphery is provided at an inner lower end portion of the frame 14 (an end portion of the frame 14 that is located on the side opposite to the side on which the frame 14 is connected to the flange portion 13). Levers 41 of the heat-sensitive disassembling unit 4, which will be described later, engage with the step 15. The outer peripheral surface (side surface) of the frame 14 has a slit 16 that serves as a "first exit" and that is formed to be open to the outer peripheral surface by extending between the inside of the frame 14 and the outside. The slit 16 communicates with a communication portion 17 that serves as a "first introduction port" in the inside of the frame 14. The communication portion 17 is open to the lower end of the frame 14. The communication portion 17 is configured to allow air to flow between the slit 16 and openings 55, which will be described later.

Figure 2:
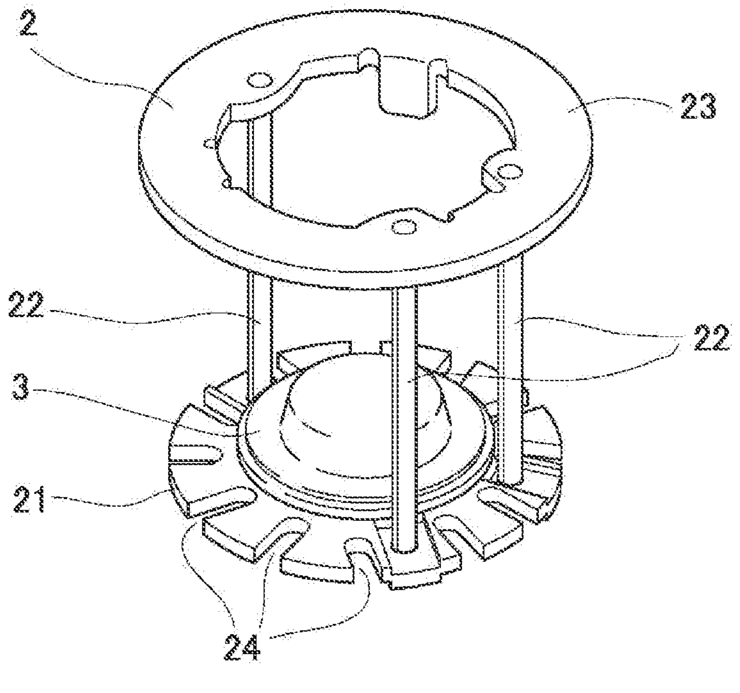
FIG. 2 is a perspective view of a deflector unit.

The deflector unit 2 illustrated in FIG. 2 includes a deflector 21, pins 22, and a guide ring 23. The deflector unit 2 is accommodated in the frame 14. The deflector 21 has a circular plate-like shape, and a plurality of slits 24 are formed in the peripheral edge of the deflector 21. A hole is formed at the center of the deflector 21 in a plate-thickness direction (the cylindrical axis direction of the body 1) so as to extend through the deflector 21, and the closing member 3 is rotatably fitted in the hole.

The plurality of pins 22 are arranged between the deflector 21 and the guide ring 23. The pins 22 are inserted through holes that are formed in the vicinity of the peripheral edge of the deflector 21 so as to extend through the deflector 21 in the plate-thickness direction (the cylindrical axis direction of the body 1). One ends of the pins 22 are fixed and connected to the guide ring 23, which has a ring-like shape, and the other ends of the pins 22 serve as flanges 25. As a result, the deflector 21 is capable of freely sliding between the guide ring 23 and the flanges 25.

As mentioned above, the one ends of the pins 22 are fixed and connected to the guide ring 23. The outer diameter of the guide ring 23 is smaller than the inner diameter of the frame 14 and larger than the inner diameter of the step 15. Thus, the guide ring 23 is configured to engage with the step 15 after falling off in response to the operation of the heat-sensitive disassembling unit 4.

The closing member 3 is formed in a disc-like shape having a protrusion on the side on which the nozzle 11 is disposed. A saddle 31 that has a plate-like shape is provided between the closing member 3 and the levers 41. The levers 41 engage with the step 15 and press the closing member 3 via the saddle 31 such that the closing member 3 is held at the position of an exit of the nozzle 11 is present, so that the closing member 3 closes an exit end of the nozzle 11.

A seal member 32 is disposed between the closing member 3 and the exit end of the nozzle 11. The seal member 32 is made of, for example, a fluorocarbon resin. Although the seal member 32 is positioned at the exit end of the nozzle 11 in the present embodiment, the seal member 32 may be disposed on the closing member 3. In this state, the deflector 21 on which the closing member 3 is placed is located at a position close to the guide ring 23 in the frame 14. A spring 33 is disposed between the guide ring 23 and the flange portion 13 so as to be urged. When the heat-sensitive disassembling unit 4 operates, the spring 33 helps the guide ring 23, the deflector 21, and the closing member 3 move to the outside from the frame 14. Note that the load of the spring 33 is smaller than the load that presses the closing member 3 against the exit end of the nozzle 11.

Figure 3:
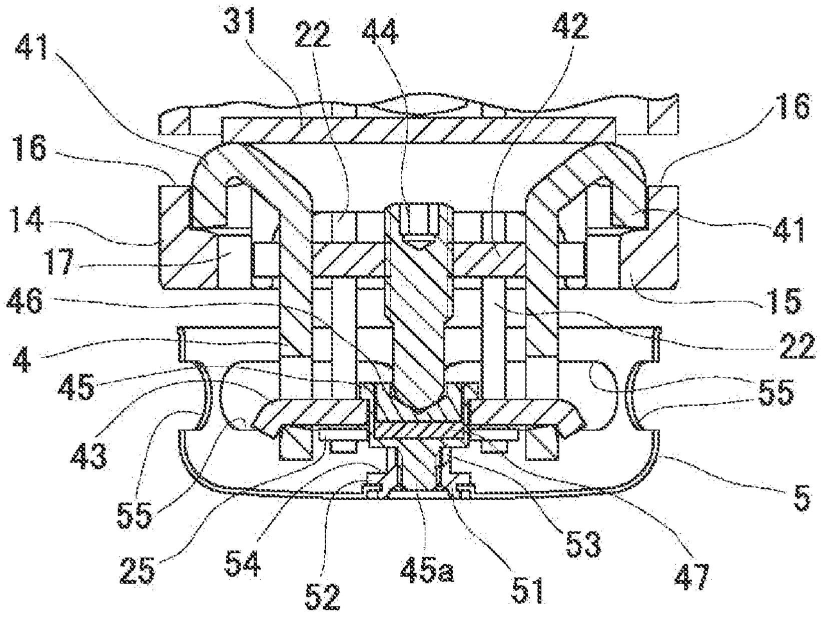
FIG. 3 is an enlarged sectional view of a heat-sensitive disassembling unit and a heat collector.
Figure 4:
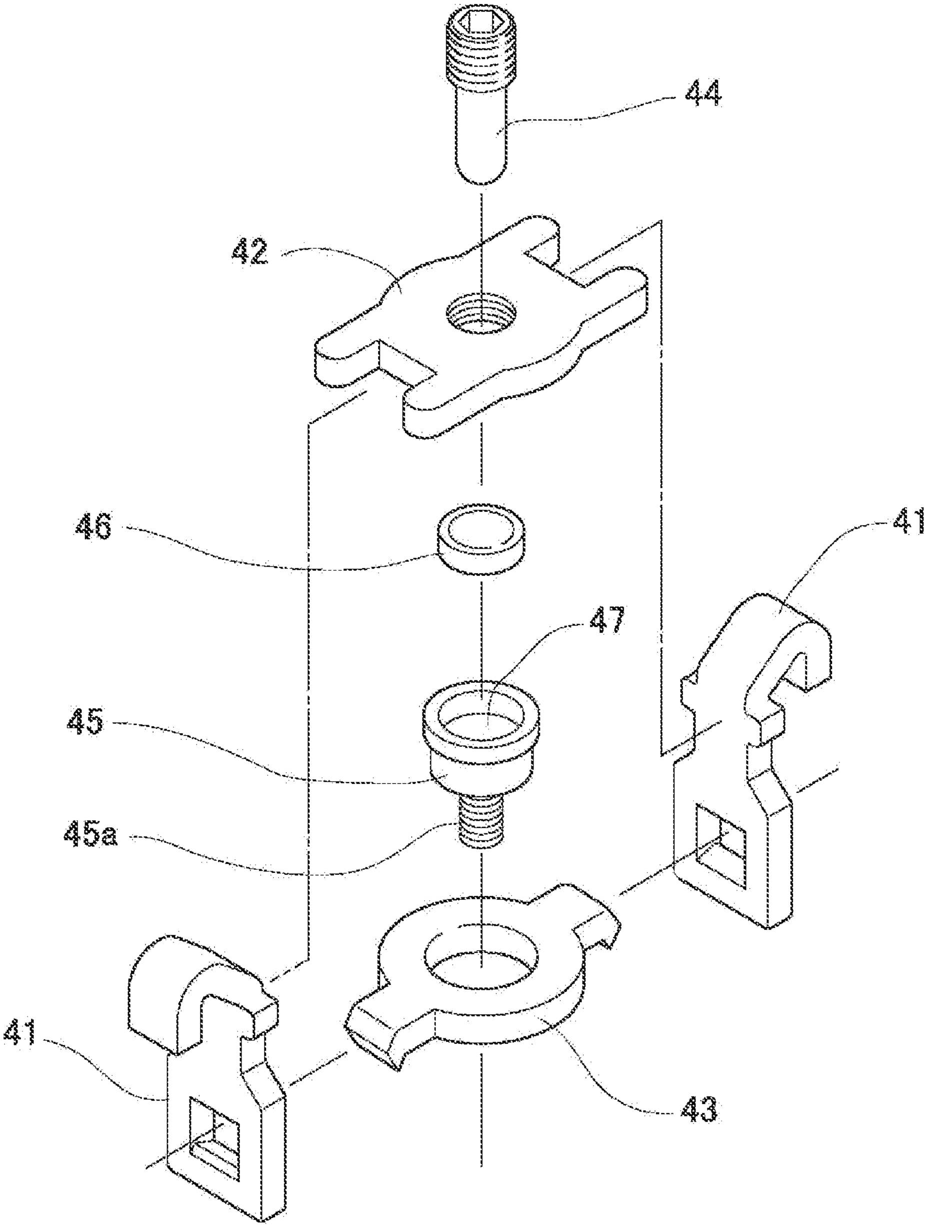
FIG. 4 is an exploded perspective view of the heat-sensitive disassembling unit.

The heat-sensitive disassembling unit 4 illustrated in FIG. 3 and FIG. 4 includes the pair of levers 41, a support plate 42, a balancer 43, a setscrew 44, a cylinder 45, a plunger 46, and a fusible alloy 47. A commonly known part in the configuration of the heat-sensitive disassembling unit 4 is described in, for example, Japanese Unexamined Patent Application Publication No. 2005-27929 or the like.

The cylinder 45 is formed in the shape of a cylinder with a bottom, and an external screw 45*a* projects from the bottom surface of the cylinder 45. The fusible alloy 47 is loaded in the cylinder 45, and the plunger 46 is placed on the fusible alloy 47 (on the side opposite to the bottom surface of the cylinder 45). These members form a heat-sensitive element. As illustrated in FIG. 3, the heat collector 5 is connected to the external screw 45*a*. As a result, the heat collector 5 is held by the body 1 so as to project from the lower end of the body 1.

The heat collector 5 has a bowl-like shape and is provided with a nut 51 attached to the center thereof. The nut 51 and the external screw 45*a* of the cylinder 45 are screwed together. The nut 51 is formed such that an end 52 thereof that is closer to the heat collector 5 has a larger diameter and such that an end 53 thereof that is closer to the cylinder 45 has a smaller diameter. As a result, a step 54 is formed at an intermediate portion of the nut 51. An adhesive poured in a threaded joint portion that is formed between the nut 51 and the external screw 45*a* after the nut 51 has been connected to the cylinder 45 is solidified.

The nut 51 is directly in contact with the bottom surface of the cylinder 45 at the end 52 thereof closer to the heat collector 5. Since the end 52 of the nut 51, which is closer to the heat collector 5, has a diameter larger than that of the end 53 of the nut 51, which is closer to the cylinder 45, and the contact area between the heat collector 5 and the nut 51 is large, a stable interface strength between the heat collector 5 and the nut 51 can be obtained. In addition, the contact area between the heat collector 5 and the nut 51 is larger than the end 53 on the cylinder side, and thus, the heat absorbed by the heat collector 5 can be efficiently transferred to the nut 51.

The outer diameter of the end 53 of the nut 51 is set to be equal to or smaller than the diameter of the bottom surface of the cylinder 45. It is more preferable that the outer diameter of the end 53 of the nut 51 be set to be equal to or smaller than the inner diameter of the cylinder 45. As a result, the heat absorbed by the heat collector 5 is transferred to the fusible alloy 47 not via, for example, the side surface of the cylinder 45, but via the nut 51 and the bottom surface of the cylinder 45, and the loss when the heat is transferred may be suppressed.

The plurality of openings 55 are formed in the side surface of the heat collector 5. The openings 55 are arranged so as to have the same length and equally spaced along the whole periphery of the side surface of the heat collector 5. In the embodiment illustrated in FIG. 1, the six openings 55 are formed. The number of the openings 55 is larger than the number of the levers 41. Each of the openings 55 has a reasonable size, so that the efficiency with which air that flows toward the heat collector 5 passes through the openings 55 can be improved. More specifically, the height of each of the openings 55 is set to 2 mm to 5 mm, and the width of each of the openings 55 is set to 8 mm to 12 mm. In such a configuration, the air heated by a fire flows into the heat collector 5 through the openings 55, and thus, the heat collector 5 can absorb the heat also from the inside thereof.

As illustrated in FIG. 1 and FIG. 3, the openings 55 and the cylinder 45 are positioned at substantially the same height, and thus, the cylinder 45 may easily absorb, through a surface thereof, the heat of air flowed in the heat collector 5 through the openings 55. The sprinkler head S is configured to allow hot air to continuously flow along a series of flow paths, that is, allow the air to flow into the heat collector 5, further flow upward, pass through the communication portion 17 of the frame 14, and be discharged to the outside from the slit 16.

In order to accelerate melting of the fusible alloy 47 due to the heat of a fire, it is important to transfer the heat absorbed by the heat collector 5 to the fusible alloy 47 through a shorter path. Thus, the sprinkler head S of the present embodiment is configured in such a manner that the cylinder 45, which is disposed close to the heat collector 5, is connected to the heat collector 5 by the nut 51 in the heat collector 5.

The height of the heat collector 5 is larger than the entire length of the cylinder 45, and thus, the entire cylinder 45 is covered with the heat collector 5. In addition, the end portions of the above-mentioned pins 22 on the side on which the flanges 25 are present are also covered with the heat collector 5. Consequently, when viewed from the inside of a room, only the heat collector 5 is exposed with respect to a ceiling C, and thus, the design of the sprinkler head S is favorable.

Figure 5:
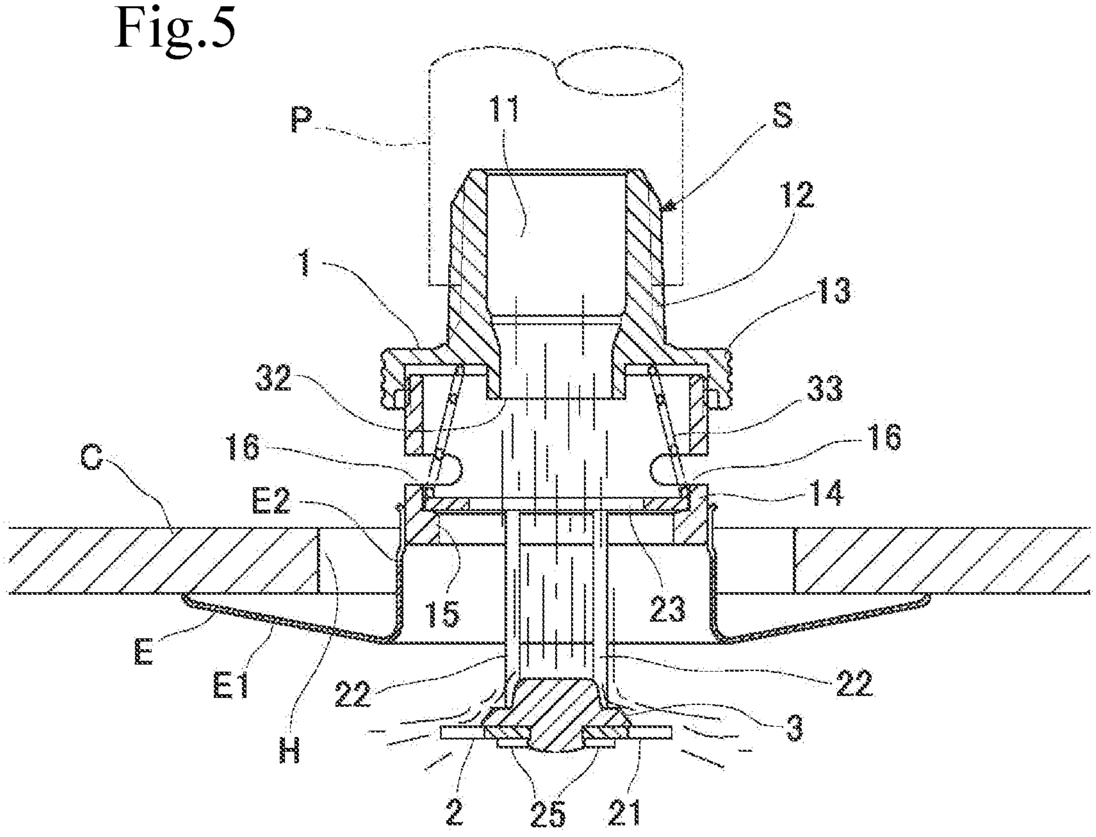
FIG. 5 is a sectional view of the sprinkler head illustrated in FIG. 1 when the sprinkler head sprays water.

When the heat-sensitive disassembling unit 4 and the heat collector 5 fall downward in FIG. 5 at the time of the operation of the sprinkler head S, the deflector 21 is secured at a position further below the lower end of the frame 14 by the pins 22 and the guide ring 23 (see FIG. 5). Thus, even in the case where the frame 14 is disposed so as not to be exposed at the ceiling C when viewed from the inside of the room, the deflector 21 becomes exposed so as to be located in the room when the sprinkler head S operates, and a normal water spray pattern is obtained. With such a configuration, even if there are slight variations in the amount of projection of the heat collector 5 (heat-sensitive disassembling unit 4) from the ceiling C, occurrence of variations in the design and the function of the sprinkler head S installed in the room can be suppressed.

Figure 7A:
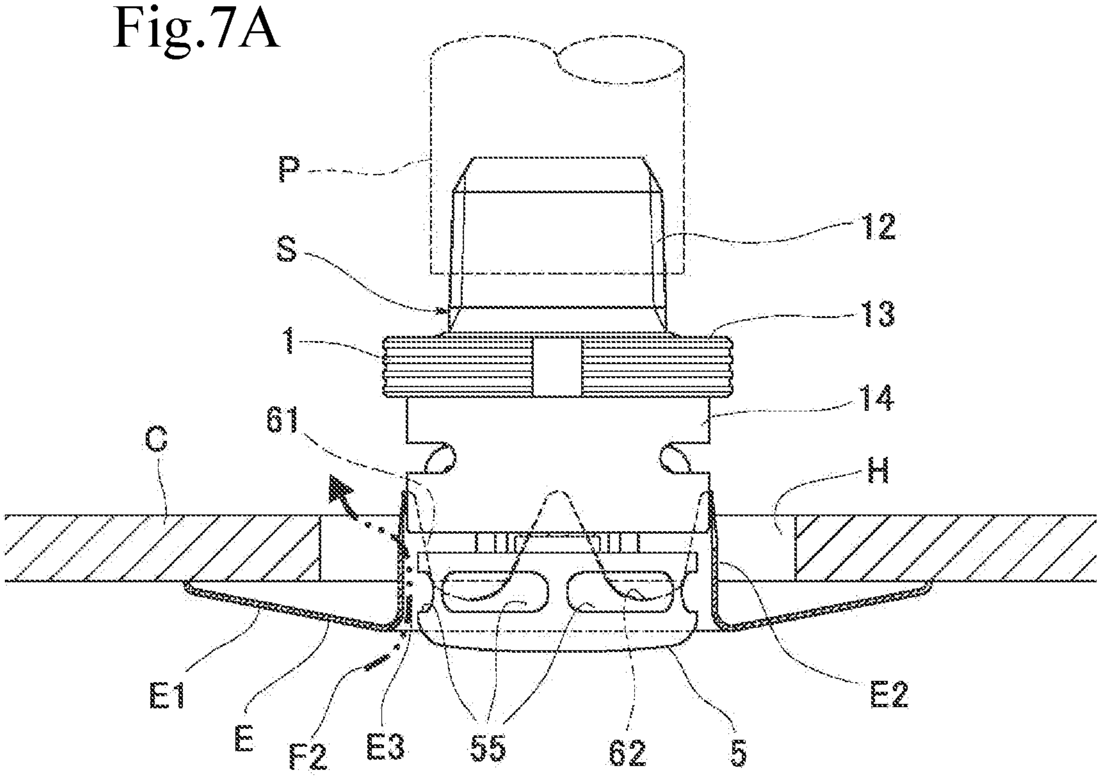
FIG. 7 illustrates the positional relationship between the escutcheon and the sprinkler head.
Figure 7B:
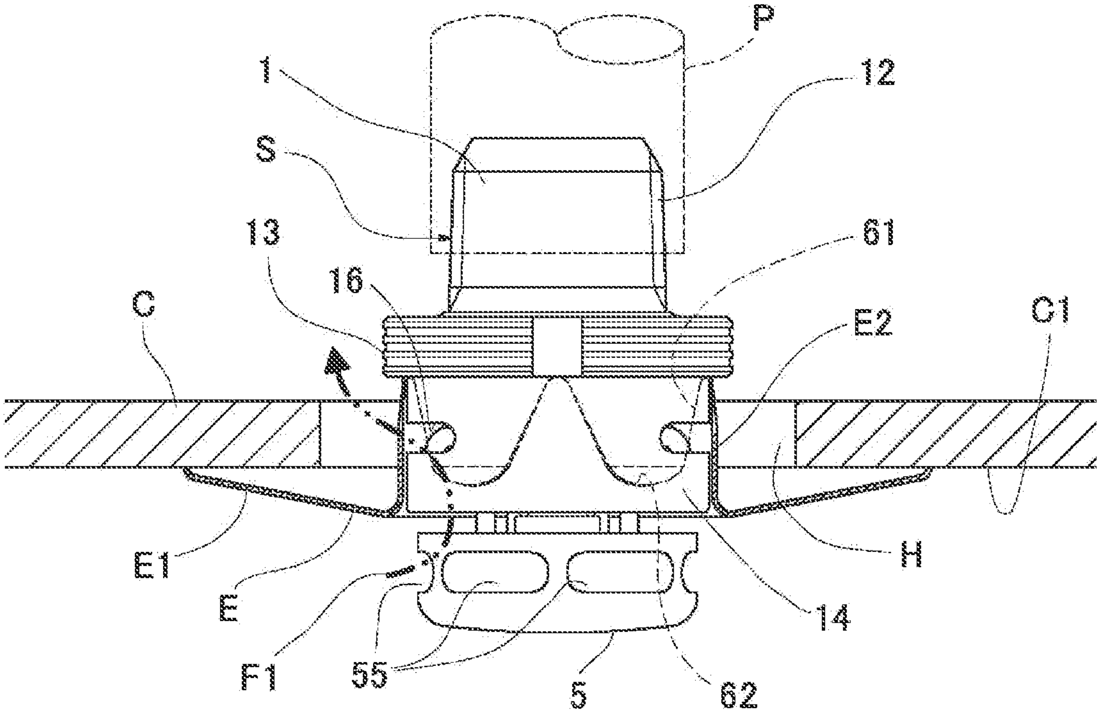

An escutcheon E includes a plate portion E1 that covers a hole H between the ceiling C and the sprinkler head S and a cylindrical portion E2 that extends from the inner edge of the plate portion E1 and engages with the frame 14. The outer peripheral edge of the plate portion E1 that extends outward from the lower end of the cylindrical portion E2 is capable of being brought into contact with a ceiling surface C1. The cylindrical portion E2 is capable of being held, with respect to the frame 14, at a "first holding position" illustrated in FIG. 7(*b*) and at a "second holding position" illustrated in FIG. 7(*a*) in accordance with its insertion depth with respect to the frame 14. As illustrated in FIG. 7(*a*), a gap E3 that serves as a "second introduction port", which is a space having a predetermined size, is formed between the cylindrical portion E2 and the heat collector 5. As illustrated in FIG. 7(*a*), the inner diameter of the cylindrical portion E2 is larger than the outer diameter of the heat collector 5 and is approximately the same as or slightly larger than the outer diameter of the frame 14.

Figure 6:
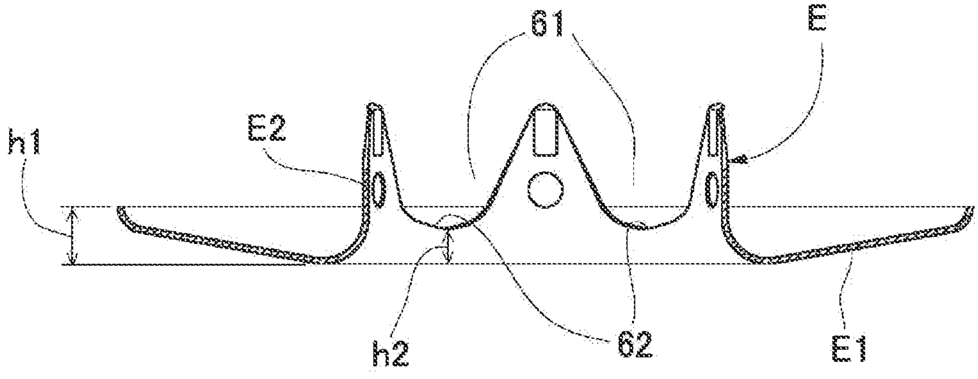
FIG. 6 is a sectional view of an escutcheon.

The cylindrical portion E2 has missing portions 61 that lacks portions of the surrounding wall of the cylindrical portion E2 and that serve as the "first exit" and a "second exit". The cylindrical portion E2 illustrated in FIG. 6 has the plurality of missing portions 61 each of which is formed in a valley shape. The missing portions 61 are formed so as to lack the cylindrical portion E2 from the upper end of the cylindrical portion E2 downward in the cylindrical axis direction of the cylindrical portion E2. In the present embodiment, the five missing portions 61 are formed so as to be equally spaced in the circumferential direction of the cylindrical portion E2.

In each of the missing portions 61, a portion that has the largest depth, that is, a portion that is closest to the lower end of the cylindrical portion E2 in the height direction, is a bottom portion 62. A height h2 from the bottom portion 62 to the lower end of the cylindrical portion E2 is shorter than a height h1 from the outer edge of the plate portion E1 to the lower end of the cylindrical portion E2. In other words, each of the missing portions 61 is deeply formed such that the bottom portion 62 is located at a position below the outer edge of the plate portion E1. This implies that, when the escutcheon E is mounted on the ceiling C, the bottom portions 62 are positioned further toward the inside of the room than the ceiling C is in the height direction. As a result, the air in the room (the outside air) may easily pass near the bottom portions 62 through the gap E3 and may easily be discharged to an area above the ceiling. As described above, the sprinkler head S has a second airflow path F2 that enables air to pass through the gap E3 and the missing portions 61.

The escutcheon E is configured such that its engagement position with the frame 14 can be adjusted in accordance with the positional relationship between the sprinkler head S and the ceiling C. To be more specific, in FIG. 1 and FIG. 7(*a*), the heat-sensitive disassembling unit 4 and the heat collector 5 each project from the ceiling C toward the inside of the room by a minimum amount, and the openings 55 are accommodated in the cylindrical portion E2. In this case, the outer edge of the plate portion E1 is in contact with the ceiling C, and an upper portion of the cylindrical portion E2 engages with a lower portion of the side surface of the frame 14. In this manner, in order to enable the sprinkler head S to be stably installed even if the height of the frame 14 that engages with the cylindrical portion E2 is minimal, in the case of employing a configuration in which the height of the cylindrical portion E2 is large, the heat collector 5, particularly the openings 55, can be accommodated in the cylindrical portion E2. Thus, the openings 55 are inconspicuous when viewed from the inside of the room, and the design of the sprinkler head S can be improved.

As illustrated in FIG. 7(*b*), also when the sprinkler head S is disposed at a position that is below the position illustrated in FIG. 7(*a*), the outer edge of the plate portion E1 is positioned so as to be in contact with the ceiling C, and thus, the position of the escutcheon E does not change. In contrast, the heat-sensitive disassembling unit 4 and the heat collector 5 further project from the ceiling C toward the inside of the room. The height of the heat collector 5 is larger than a height h1 from the outer edge of the plate portion E1 to the lower end of the heat collector 5, and thus, when, for example, a contact surface in which the outer edge of the plate portion E1 and the ceiling C are in contact with each other and the lower end of the frame 14 are positioned at the same height, a portion of the heat collector 5 is exposed when viewed from the inside of the room. In addition, as in the present embodiment, when the height of the cylindrical portion E2 and the height of the frame 14 engaging with the cylindrical portion E2 are approximately the same as each other, the heat collector 5 is positioned below the plate portion E1, and the openings 55 are located outside the cylindrical portion E2 and exposed when viewed from the inside of the room. In this case, the upper portion of the cylindrical portion E2 engages with an upper portion of the side surface of the frame 14.

In the state illustrated in FIG. 7(*b*), since the cylindrical portion E2 that is located at the "first holding position", and the frame 14 engages with the cylindrical portion E2 across the overall height of the cylindrical portion E2, the gap E3 is not formed. However, hot air generated by a fire passes through the openings 55 of the heat collector 5 and transfers heat to the heat-sensitive disassembling unit 4 inside the heat collector 5. Then, the air inside the heat collector 5 is discharged to outside the sprinkler head S through the slit 16 (see FIG. 3) of the frame 14. In this case, the air passes through the missing portions 61 of the escutcheon E that communicate with the slit 16 by overlapping the slit 16 so as to serve as the "first exit", and thus, the escutcheon E can be prevented from becoming an obstacle to the flow of the air.

The sprinkler head S has a first airflow path F1 that is formed in the manner described above and that enables air that flows into the heat collector 5 from the openings 55 to pass through the slit 16 and the missing portions 61 via the inside of the heat collector 5 and the communication portion 17, which is open to the lower end of the frame 14 and which serves as the "first introduction port". Thus, also in the state where the gap E3 is not formed, the sprinkler head S can generate a continuous airflow by facilitating discharging of hot air, which is generated in the room due to a fire, to the area above the ceiling. As a result, heat can be efficiently transferred to the heat collector 5, the cylinder 45, and so forth, so that an early operation of the heat-sensitive disassembling unit 4 can be facilitated.

According to the present embodiment, when the cylindrical portion E2 is located at the "first holding position", it forms the first airflow path F1, and when the cylindrical portion E2 is located at the "second holding position", it forms the second airflow path F2, so that a continuous airflow can be generated by facilitating discharging of the outside air to the area above the ceiling regardless of whether the cylindrical portion E2 is located at the first holding position or the second holding position. Therefore, according to the present embodiment, the heat of air that is generated in the room due to a fire can be efficiently transferred to the heat collector 5, so that the early operation of the sprinkler head S can be facilitated.

Here, in the above-described escutcheon E, the height of the cylindrical portion E2 is larger than the length from lower end of the flange portion 13 to the lower end of the frame 14. In the case of employing such a configuration, the lower end of the cylindrical portion E2 is continuously positioned below the lower end of the frame 14. In particular, when the heat-sensitive disassembling unit 4 is caused to operate in the state illustrated in FIG. 7(*a*), the pair of levers 41 rotate in a direction in which the lower ends of the pair of levers 41 move away from each other. In this case, interference between the rotated levers 41 and the cylindrical portion E2 can be avoided by the gap portion E3.

In addition to the above-mentioned gap E3, by employing a configuration in which the shape of a portion in which the plate portion E1 and the lower end of the cylindrical portion E2 are connected to each other is a curved shape, a configuration in which a lower end portion of the cylindrical portion E2 such as that indicated by a dashed line in FIG. 1 has a tapered shape, or the like, interference between the rotated levers 41 and the cylindrical portion E2 can be more effectively avoided. More specifically, a configuration is employed in which, in the state where the escutcheon E is mounted on the sprinkler head S as illustrated in FIG. 1, the boundary between a curved portion (or a tapered portion) and the cylindrical portion E2 is positioned further toward the upper end of the cylindrical portion E2 than the lower ends of the levers 41. It is preferable that an angle D of the tapered portion with respect to the ceiling surface C1, which is a lower flat surface (horizontal surface) of the ceiling C, be 5 degrees to 45 degrees. The above-mentioned shapes are not limited to a curved shape and a tapered shape and may each be formed of a recess, a stepped portion, or the like.

Note that the height of the cylindrical portion E2 can be set to be smaller than the length from the lower end of the flange portion 13 to the lower end of the frame 14. As a result, the area in which the frame 14 engages with the cylindrical portion E2 that is located at the "first holding position" can be further expanded.

The operating process of the sprinkler head S according to the embodiment of the present invention in the event of a fire will now be described.

As illustrated in FIG. 1, the sprinkler head S is disposed such that the body 1 is connected to the water supply pipe P by screw connection and such that the heat collector 5 is exposed at the ceiling C when viewed from the inside of the room. The ceiling C has the hole H into which the sprinkler head S is inserted toward the inside of the room, and the escutcheon E is disposed so as to cover the hole H.

When a fire breaks out, the air in the room is heated by the heat of the fire in such a manner as to generated an upward air flow, and the heated air accumulates under the ceiling C. The air flows along the plate portion E1 of the escutcheon E by using the upward air flow as its driving force and flows into the gap E3 between the cylindrical portion E2 and the heat collector 5. In addition, the air passes through the openings 55 and reaches the inside of the heat collector 5. The heat of the air is absorbed through the surfaces of the heat collector 5, the nut 51, and the cylinder 45 and transferred to the fusible alloy 47 so as to help the fusible alloy 47 melt.

When the fusible alloy 47 melts, the plunger 46 moves in a direction toward the bottom surface of the cylinder 45 such that engagement of the balancer 43 and the levers 41 is loosened, and the lower ends of the levers 41 rotate and become separated from the balancer 43. The levers 41 further rotate and fall off from the step 15 of the frame 14. In addition, the saddle 31 and the closing member 3 that are placed on the levers 41 also fall off to the outside of the frame 14.

The deflector unit 2 in which the closing member 3 is incorporated is moved in a direction toward the step 15 by the action of the spring 33 in such a manner that the outer edge of the guide ring 23 engages with the step 15. The deflector 21 and the closing member 3 move downward in FIG. 5 along the pins 22 and engage with the flanges 25. As a result, the deflector 21 and the closing member 3 are hung below the frame 14 by the pins 22. When the closing member 3 is separated from the exit end of the nozzle 11, water in the water supply pipe P is released from the nozzle 11 and strikes the deflector 21. The water that has stricken the deflector 21 is sprayed in all directions so as to suppress or extinguish the fire.

As a modification of the above-described embodiment, by forming a plurality of grooves, protrusions, or the like in or on the side surface of the nut 51 so as to increase the surface area, the heat collector 5 can absorb more heat through the nut 51. Alternatively, the bottom surface of the cylinder 45 may be positioned on the top surface of the balancer 43. As a result, the side surface of the cylinder 45 is exposed, so that the cylinder 45 can absorb more heat.

As illustrated in FIG. 1, in the sprinkler head S, also in a state where the openings 55 are accommodated in the cylindrical portion E2, air can be introduced into the openings 55 by the gap E3 between the cylindrical portion E2 and the heat collector 5. By forming a tapered shape on the inner edge side of the plate portion E1 as indicated by a dashed line FIG. 1 in order to facilitate introduction of the air, the air may easily flow toward the openings 55.

In addition, by facilitating discharging of hot air generated in the room due to a fire by the above-described configurations of the missing portions 61, a continuous airflow can be generated. As a result, the heat can be efficiently transferred to the heat collector 5, the cylinder 45, and so forth, and the early operation of the heat-sensitive disassembling unit 4 can be facilitated.

REFERENCE SIGNS LIST

1 body
2 deflector unit
3 closing member
4 heat-sensitive disassembling unit

5 heat collector
11 nozzle
14 frame
15 step
16 slit (first exit)
17 communication portion (first introduction port)
21 deflector
22 pin
23 guide ring
31 saddle
32 seal member
33 spring
41 lever
43 balancer
45 cylinder
46 plunger
47 nut
51 opening
55 opening
61 missing portion (first exit, second exit)
C1 ceiling surface
E escutcheon
E1 plate portion
E2 cylindrical portion
E3 gap (second introduction port)
F1 first airflow path
F2 second airflow path
S sprinkler head

The invention claimed is:

1. A sprinkler head comprising:

a body having a slit that is open to an outer peripheral surface of the body;

a heat collector held by the body in such a manner as to project from a lower end of the body; and an escutcheon including a cylindrical portion that engages with the body and a plate portion that has an outer peripheral edge extending outward from a lower end of the cylindrical portion, the outer peripheral edge being capable of being brought into contact with a ceiling surface, wherein the heat collector is exposed with respect to the ceiling surface in an installed state such that the heat collector is uncovered, wherein the cylindrical portion has a missing portion that lacks a surrounding wall of the cylindrical portion, wherein the body is capable of being held, with respect to the cylindrical portion, at anywhere between a first holding position and at a second holding position in accordance with an insertion depth of the body with respect to the cylindrical portion, wherein the sprinkler head forms, at the first holding position, a first airflow path in which a communication portion that is open to the lower end of the body serves as a first introduction port for outside air and in which the missing portion of the cylindrical portion serves as, by overlapping the slit of the body, a first exit through which the outside air that has flowed in the body is discharged to an area above a ceiling, and wherein the sprinkler head forms, at the second holding position, a second airflow path in which a gap that is formed between the escutcheon and the heat collector serves as a second introduction port for the outside air and in which the missing portion of the cylindrical portion serves as a second exit through which the outside air is discharged to the area above the ceiling, the heat collector has a plurality of openings on a periphery of a side surface of the heat collector, the plurality of openings partially overlapped with the missing portion in a horizontal plane.

2. The sprinkler head according to claim 1, further comprising:

a heat-sensitive element that is accommodated in the heat collector, wherein the heat-sensitive element includes a cylinder that has a cylindrical shape with a bottom and in which a fusible alloy is loaded, and wherein an external screw that projects from a bottom surface of the cylinder is connected to a nut that is provided on the heat collector, and the nut has an end that is closer to the heat collector and that has a larger diameter and another end that is closer to the cylinder and that has a smaller diameter.

3. The sprinkler head according to claim 2, wherein an outer diameter of the nut on the cylinder side is equal to or smaller than a diameter of the bottom surface of the cylinder.

4. The sprinkler head according to claim 2, wherein an outer diameter of the nut on the cylinder side is equal to or smaller than an inner diameter of a portion of the cylinder that loads the fusible alloy.

5. The sprinkler head according to claim 1, wherein the plate portion is tapered on an inner edge side.

6. The sprinkler head according to claim 1, wherein the missing portion is formed so as to lack the cylindrical portion from the upper end of the cylindrical portion downward in the cylindrical axis direction of the cylindrical portion.

7. The sprinkler head according to claim 1, wherein a height from a bottom portion of the missing portion, the bottom portion being closer to the lower end of the cylindrical portion than other portions of the missing portion are, to the lower end of the cylindrical portion is smaller than a height from an outer edge of the plate portion to the lower end of the cylindrical portion so that the bottom portion of the missing portion is located lower than the ceiling surface.

8. The sprinkler head according to claim 1, wherein at the first holding position, the plurality of openings is accommodated in the cylindrical portion.

9. The sprinkler head according to claim 1, wherein a cylinder is entirely covered with the heat collector.

10. The sprinkler head according to claim 6, wherein the missing portion is formed multiple times in a row in the circumferential direction of the cylindrical portion.

11. The sprinkler head according to claim 6, wherein the missing portion is formed multiple times in a row so as to be equally spaced in the circumferential direction of the cylindrical portion.

12. The sprinkler head according to claim 1, wherein at the first holding position, the outside air flowing into the heat collector through the openings is discharged outside from the slit via the first introduction port.

13. The sprinkler head according to claim 1, wherein at the first holding position, a gap is not formed between the heat collector and the body for the outside air.

14. The sprinkler heat according to claim 1, wherein the plurality of openings are formed on a whole periphery of the side surface of the heat collector.

* * * * *